Patented Apr. 25, 1950

2,504,953

UNITED STATES PATENT OFFICE 2,504,953

STABILIZED CHLORAL

Dwight Williams, Charleston, W. Va., Robert M. Thomas, St. Louis, Mich., and George S. Haines, South Charleston, W. Va., assignors to Food Machinery and Chemical Corporation, New York, N. Y., a corporation of Delaware No Drawing. Application March 15, 1949, Serial No. 81,613

10 Claims. (Cl. 260—601)

This invention relates to stabilized chloral suitable for commercial use.

This application is a continuation-in-part of our copending application Serial No. 650,728, filed February 27, 1946.

Chloral is becoming increasingly important as a commercial organic chemical where it is used in organic syntheses and as a pharmaceutical agent. Its prominence as a commercial chemical has been greatly increased by its being used as an intermediate in the production of D. D. T., namely, 2,2-bis-(4-chlorophenyl)-1,1,1-trichloroethane.

Chloral (trichloroacetaldehyde) is a substance which exists in polymeric as well as monomeric form. The monomer is a liquid having a freezing point of about −57° C. and a boiling point of about 97° C., while the polymers are solids. Upon standing at ordinary temperatures, the commercial monomer changes to one or more polymeric solid forms. The problem of polymerization does not occur if the liquid chloral is used when freshly prepared, but, from a practical viewpoint, this is frequently impossible. Regardless of whether the chloral is used per se or as an intermediate, it is decidedly difficult and disadvantageous to use the liquid and solid form conjointly. Generally speaking, it is far better to have the chloral in the liquid form. The polymers may be reconverted to the liquid monomer by distillation in the presence of mineral acids or by other costly procedures which should be avoided. Thus it is of great practical importance to provide commercial chloral in a form which is stable in storage.

Previous attempts to stabilize chloral have been directed principally towards stabilizing it against its tendency to undergo autoxidation in the presence of air. Some success has been experienced in the stabilizing of chloral, but all of the stabilizers known in the prior art have imparted color to the chloral of such intensity that the chloral is no longer suitable for commercial purposes.

It is therefore a major purpose of this invention to provide chloral having its tendency to polymerize substantially completely inhibited or greatly retarded by the incorporation of a stabilizing agent without imparting any color to the chloral or by imparting color which is not of objectionable intensity. It is a special object of our invention to provide chloral which is sufficiently stable in storage and during transportation to permit its being supplied to manufacturers in a form suitable for use as an intermediate in the economical manufacture of D. D. T. substantially free of objectionable color.

We have found that aliphatic amines and certain other nonaromatic compounds containing nitrogen have the property of substantially completely inhibiting the tendency of the monomeric chloral to polymerize while imparting either no color or color of an intensity which is not objectionable.

The aliphatic amines and certain other nonaromatic amine compounds exert a superior inhibiting action upon the tendency of the chloral to polymerize. Some of these nitrogen compounds impart discernible color to the chloral, but the preferred compounds can be incorporated in effective quantities without imparting color of an objectionable intensity. Among the nitrogen compounds found particularly suitable are the primary aliphatic amines of 1 to 18 carbon atoms, more particularly the monoalkyl amines having 5 to 18 carbon atoms, and especially those having 10 to 18 carbon atoms, including n-decylamine, n-dodecylamine, n-tetradecylamine, n-hexadecylamine, and n-octadecylamine. The preferred amines are n-decylamine, n-dodecylamine, and n-tetradecyl amine, the n-dodecylamine being especially effective as a stabilizer of chloral. Other suitable amine nitrogen compounds are morpholine, certain secondary and tertiary aliphatic amines, and the cycloaliphatic primary amine cyclohexylamine.

The inhibitors or stabilizers may be incorporated in varying amounts depending upon their inhibiting action and upon the tendency of the chloral to polymerize under the storage conditions used. Generally speaking, percentages within the range of 0.05 and 0.25 per cent by volume are adequate, although percentages as low as 0.01 per cent under certain circumstances exhibit sufficient stabilizing action. In general, however, percentages below 0.01 per cent are inadequate, and percentages substantially above 1 per cent by volume actually accelerate the polymerization of the chloral. Thus the amount of amine introduced into the chloral composition as a stabilizer is normally of the order of 0.01 to 1 per cent by volume.

In evaluating the capacity of the stabilizers to inhibit the tendency of chloral to polymerize, we found that variations in the specific gravity of the chloral were not always a reliable index of the degree of polymerization, for the specific gravity may be increased by the formation of chloral hydrate through the absorption of moisture from the atmosphere. We observed further that turbidity represents a useful qualitative index of the degree of polymerization, but such an index does not constitute a quantitative evaluation. Knowing that the polymer of chloral is practically insoluble in water while chloral itself is soluble in water, a special procedure was developed for a quantitative determination of the amount of polymer present in a monomer composition which had stood over a considerable period of time. The procedure consisted in adding 10 milliliters of chloral to 100 milliliters of water, boiling for two or three minutes, filtering, drying the precipitate, and weighing the latter. The dried precipitate represented the amount of chloral which had been converted into the solid polymer. In order to obtain a measurement of the potency of the various inhibitors, a rating was calculated by dividing the concentration of the polymer in a test specimen by the concentration of the polymer in the control specimen and multiplying this ratio by 100. This device gave a comparison on a percentage basis of the relative amount of polymer present, respectively, in the test and the control specimens. For instance, a rating of 1.0 indicates that only 1 per cent as much polymer was formed in the test specimen as in the control specimen.

In order to determine the amount of color present in the test specimen, both visual observation and photoelectric measures of the light absorbed by a layer of the chloral were used. The photoelectric evaluation was made with a 40 millimeter layer of chloral, using a C5-47 Wratten filter (blue). The color index assigned was based upon the percentage of incident light which was absorbed by the liquid. It was not possible to determine the color of the control samples by photoelectric means due to the presence of turbidity resulting from polymerization. Visually, control samples had no color after standing for thirty days.

The tables which follow constitute an evaluation of a number of compounds which have been found suitable for stabilizing chloral against polymerization evaluated in accordance with the procedure outlined above. In several instances, indicated by omissions from the table, the photoelectric evaluation of the intensity of the color was not accurately obtainable. In certain instances the inability to accurately measure the color intensity photoelectrically was due to the fact that the inhibitor or stabilizer was not completely soluble in the chloral.

The comparisons were made by keeping the control and the experimental samples in a dark room for thirty days before the degree of polymerization of the chloral was evaluated.

Table I.—Nitrogen compounds

| Compound | Conc., Vol., Per Cent | Stability Rating | Color, Visual | Color Photo-elec. |
|---|---|---|---|---|
| Ethylene diamine | 0.10 | 0.5 | Yellow | 30 |
| Di-n-propylamine | 0.10 | 4.0 | do | 58 |
| Di-n-butylamine | 0.10 | 4.0 | do | 42 |
| n-Amylamine | 0.10 | 0.5 | do | 49 |
| Triamylamine | 0.10 | 3.0 | do | 42 |
| Cyclohexylamine | 0.10 | 0.9 | Orange | |
| Mono-n-decylamine | 0.10 | 0.5 | Yellow | 20 |
| Mono-n-dodecylamine | 0.05 | 0.3 | None | 10 |
| Mono-n-dodecylamine | 0.10 | 0.3 | Yellow | 48 |
| Mono-n-dodecylamine | 0.25 | 0.3 | Orange | 68 |
| Mono-n-tetradecylamine | 0.10 | 0.3 | Yellow | 17 |
| Mono-n-hexadecylamine | 0.10 | 0.2 | None | |
| Mono-n-octadecylamine | 0.10 | 0.6 | Yellow | |
| Morpholine | 0.10 | 12.0 | None | 8 |
| Control | | 100 | do | |

Certain aromatic compounds have been suggested as stabilizers for chloral, especially against autoxidation, but in accordance with our evaluations they are unsatisfactory as stabilizers against polymerization. Apparently in the oxidation tests of the prior art, the chloral was purified by converting it to metachloral in the presence of sulfuric acid, washing the metachloral, and reconverting the metachloral to chloral by heating. The chloral used in all of our evaluations was purified by contacting it with sulfuric acid, decanting it therefrom, and distilling it from the decanted mass.

The following table shows the relative unsuitability of a representative group of aromatic compounds for stabilizing chloral against polymerization particularly when the intensity of the color imparted is taken into consideration. In the evaluations the inhibitor was added in a quantity equaling 0.1 per cent by volume when the inhibitor was a liquid and in a quantity equaling 0.1 per cent by weight when the inhibitor was a solid.

Table II.—Aromatic compounds

| Compound | Stability Rating | Color, Visual | Color Photo elec. |
|---|---|---|---|
| Phenylene diamine | 6 | Brown | 100 |
| Phenyl-naphthylamine | 6 | Black | 100 |
| o-Aminophenol | 8 | do | 100 |
| Diphenylamine | 8 | do | 100 |
| Aniline | 9 | do | 100 |
| Pyridine | 14 | do | 100 |
| α-Naphthol | 14 | Yellow | 59 |
| Phenol | 85 | Black | 100 |
| Hydroquinone | 91 | Pink | 100 |
| Catechol | 97 | Red | 100 |
| Resorcinol | 99 | Black | 100 |
|  | 122 | Red | 100 |

Apparently due to the tendency of amines in relatively high concentration to accelerate the polymerization of chloral or to form addition products, it has been found difficult to introduce the amines into the chloral without experiencing the formation of solid substances. The formation of the solid substances can be minimized by the very slow introduction of the amines or by prolonged agitation of chloral during or after the introduction of the amine stabilizer. It has been found that the above disadvantages can be overcome and the stabilizer rapidly introduced if the stabilizer is composed of the amine and a minor proportion of a nonaromatic ether. Normally the amount of ether used is of the order of one third of the amount of amine, but other proportions may be used provided the major proportion of the stabilizing composition is the amine and the principal stabilizing action is imparted by the amine. Suitable nonaromatic ethers include various aliphatic and cyclic ethers. Diethyl ether, diisopropyl ether, and 1,4-dioxane have been found especially suitable; for they not only exert a stabilizing effect upon the chloral but may be readily dissolved in the chloral in desired quantities without imparting any color whatsoever to the chloral composition.

It has been observed that iron chloride which is formed in certain containers accelerates the polymerization of chloral. In order to evaluate the effectiveness of the stabilizer composition composed of nonaromatic ethers and nonaromatic amines, the stability of chloral with various percentages of iron chloride and various percentages of stabilizer was evaluated after storage for sixty-four days. The stabilizer was composed of a mixture of commercial primary aliphatic amines, known under the trade name of Armeen CD, containing 33⅓ per cent of ethyl ether. Armeen CD is a commercially pure mixture of octyl to octa-decylamines. The stabilizer was introduced into the chloral and sufficient agitation used to obtain uniform distribution. No prolonged agitation was necessary, and no initial formation of solid substances was observed. The table hereinbelow sets out the results of the evaluation.

Table III.—Stability tests with added ferric chloride

| $FeCl_3$, Wt. per cent | Stabilizer, vol. per cent | | Polymer after 64 days, Wt. per cent |
|---|---|---|---|
| | Armeen CD | Ether | |
| 0.00 | 0.00 | 0.00 | 0.2 |
| 0.00 | 0.075 | 0.025 | 0.0 |
| 0.01 | 0.00 | 0.00 | 11.7 |
| 0.01 | 0.075 | 0.025 | 0.0 |
| 0.01 | 0.15 | 0.05 | 0.0 |
| 0.01 | 0.30 | 0.10 | 0.0 |
| 0.01 | 0.60 | 0.20 | 0.1 |
| 0.02 | 0.00 | 0.00 | 34.5 |
| 0.02 | 0.075 | 0.025 | 0.0 |
| 0.02 | 0.15 | 0.05 | 0.0 |
| 0.02 | 0.30 | 0.10 | 0.0 |
| 0.02 | 0.60 | 0.20 | 0.2 |
| 0.04 | 0.00 | 0.00 | 40.0 |
| 0.04 | 0.075 | 0.025 | 0.2 |
| 0.04 | 0.15 | 0.05 | 0.0 |
| 0.04 | 0.30 | 0.10 | 0.0 |
| 0.04 | 0.60 | 0.20 | 0.1 |

In referring to nonaromatic amines or nonaromatic ethers, we mean those amines and ethers which do not contain an aromatic group attached directly to the amine nitrogen atom or the ether oxygen atom.

It will be undersood that the foregoing description of our invention is illustrative and that modifications, adaptations, and alterations in the procedures and compositions disclosed may be made without departing from the scope of our invention which is defined in the appended claims.

We claim:

1. A process for substantially completely inhibiting the tendency of chloral to polymerize which comprises incorporating in chloral about 0.01 to 1 per cent thereof of a nonaromatic amine.

2. A process for substantially completely inhibiting the tendency of chloral to polymerize which comprises incorporating in chloral an admixture of a nonaromatic amine and a minor quantity of a nonaromatic ether wherein the quantity of the amine is of the order of 0.01 to 1 per cent by volume of the chloral.

3. A chloral composition substantially completely stabilized against polymerization comprising chloral having dissolved therein of the order of 0.01 to 1 per cent by volume of a primary aliphatic amine.

4. A chloral composition substantially completely stabilized against polymerization comprising chloral having dissolved therein a stabilizer composition composed of a nonaromatic amine and a lesser quantity of a nonaromatic ether wherein the quantity of the amine is of the order of 0.01 to 1 per cent by volume of the chloral.

5. A chloral composition substantially completely stabilized against polymerization comprising chloral having dissolved therein a stabilizing composition composed of a primary aliphatic amine of 5 to 18 carbon atoms and a lesser quantity of ethyl ether wherein the quantity of the amine is of the order of 0.01 to 1 per cent by volume of the chloral.

6. A chloral composition substantially completely stabilized against polymerization comprising chloral having dissolved therein of the order of 0.01 to 1 per cent by volume of n-decylamine.

7. A chloral composition substantially completely stabilized against polymerization comprising chloral having dissolved therein of the order of 0.01 to 1 per cent by volume of n-dodecylamine.

8. A chloral composition substantially completely stabilized against polymerization comprising chloral having dissolved therein of the order of 0.01 to 1 per cent by volume of n-tetradecylamine.

9. A chloral composition substantially completely stabilized against polymerization comprising chloral having dissolved therein of the order of 0.01 to 1 per cent by volume of n-amylamine.

10. A chloral composition substantially completely stabilized against polymerization comprising chloral having dissolved therein of the order of 0.01 to 1 per cent by volume of ethylene diamine.

DWIGHT WILLIAMS.
ROBERT M. THOMAS.
GEORGE S. HAINES.

No references cited.